Patented Apr. 26, 1927.

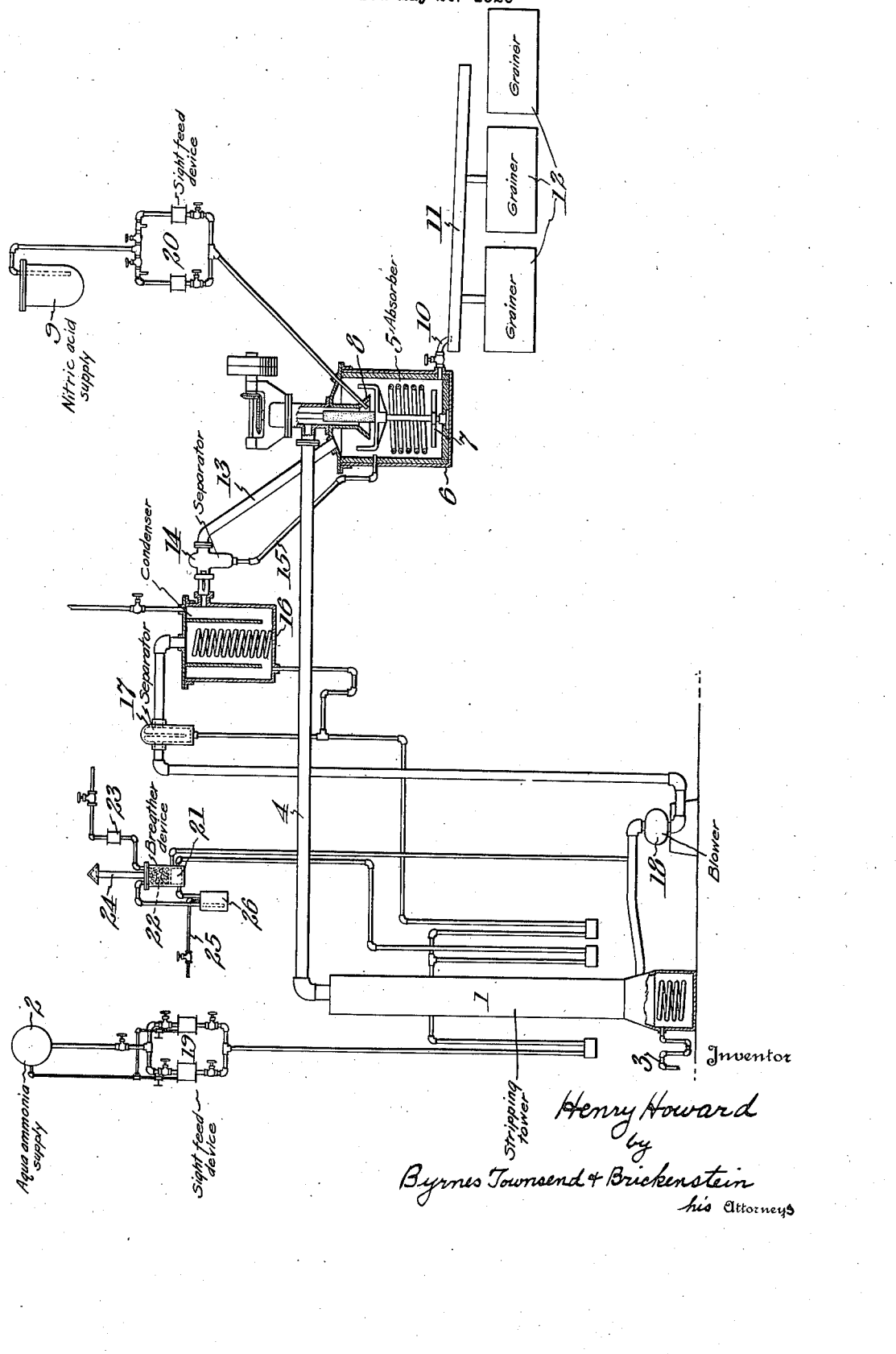

1,625,807

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS FOR THE MANUFACTURE OF AMMONIUM NITRATE.

Application filed May 26, 1926. Serial No. 111,838.

This invention relates to a process for the manufacture of ammonium nitrate by the neutralization of nitric acid with ammonia and consists generally in absorbing ammonia from a gas mixture, formed, for instance, by passing an inert gas such as air in contact with a water solution of ammonia, in a solution of ammonium nitrate, adding nitric acid to the solution of ammonium nitrate to combine with the absorbed ammonia and reusing the unabsorbed portion of the gas mixture for conveying more ammonia from the water solution thereof to the ammonium nitrate solution in a continuous cycle.

The principal object of the invention is to devise a simple and continuous process in which loss of the reacting materials is avoided.

As is well known when a gas comprising ammonia is contacted with a solution of ammonium nitrate and the absorbed ammonia is neutralized by the addition of nitric acid heat is developed and even when the reaction conditions are carefully controlled quantities of the reagents, which may amount to as much as 10%, are lost. Various means have been devised for avoiding this loss such as the use of a reflux condenser operating upon the exit gases from the ammonia absorber and scrubbing the exit gases with nitric acid.

In accordance with the present invention loss is positively prevented by the employment of a closed system operated preferably under slightly reduced pressure at least in those parts where losses may occur by leakage.

The details of the process will be described in connection with the operation of an apparatus suitable for the execution of the process illustrated in the accompanying drawing.

Referring to the drawing, 1 is a stripping tower to which a water solution of ammonia of say 20% strength is supplied through the sight feed device 19 from a suitable source of supply represented by the tank 2. The water from which the ammonia is stripped in the tower 1 is discharged through the sealed pipe 3 to waste and the ammonia with the stripping gas, such as air, the gas mixture preferably containing from 20 to 25% of ammonia, passes by way of the pipe 4 to the absorber 5. The absorber 5 is of conventional design and comprises the closed vessel 6, an agitator or stirrer 7 and a submerged hood or distributor 8 under which the ammonia containing gas and the nitric acid are introduced. Nitric acid of say 50% concentration is supplied to the absorber 5 from a source of supply represented by the tank 9 through the sight feed device 20 and ammonium nitrate liquor produced is discharged from the absorber 5 through the cock 10 and by way of the conduit 11 to the grainers 12. The gases leaving the absorber 5 pass by way of pipe 13 through the separator 14 from which the return pipe 15 delivers any liquid separated from the gases back into the absorber 5 and thence through the cooler and condenser 16, separator 17, and blower 18 back into the stripping tower 1, thus completing its cycle of movement. Any liquid separated from the gas by the condenser 16 and separator 17 is delivered as indicated into the stripping tower 1.

As stated the absorber preferably is maintained under a slightly reduced pressure to avoid losses. This may involve a continual slight leakage of air into the system, which must be disposed of and for this purpose the breather 21 is provided. Any excess of air in the system passes through the small coke filled tower 22 of the breather where it is scrubbed with water supplied through the sight feed 23 to retain any ammonia in the gases. The resulting water solution of ammonia is delivered to the stripping tower 1 while the ammonia-free air passes to the atmosphere through the pipe 24. In case a deficiency of air in the system occurs such as when the absorber 5 is operated for a time with a deficiency of nitric acid followed by a correction of this condition the breather device 21 serves to make up this deficiency by the admission of air through the pipe 25 and water trap 26.

Certain details of the apparatus which may be used in practice such as control apparatus and description of details of the apparatus which is not essential to an understanding of the invention are omitted.

The operation of the process in the apparatus illustrated is as follows:

The water solution of ammonia is fed into the stripping tower 1 from the tank 2 at a suitable rate where it is contacted with a countercurrent flow of gas from the blower 18 and the resulting gas mixture preferably containing about 20 to 25% of $NH_3$ flows by way of pipe 4 to the absorber 5 where it is contacted with the solution of ammonium nitrate, to which nitric acid is supplied, for instance as 50% nitric acid solution, from the tank 9. Such a solution of nitric acid is conveniently obtained by the known process of burning ammonia in the presence of platinum gauze and condensing and absorbing the resulting nitrogen oxid gases and the operation of the ammonia stripping tower may be the same as that of the stripping tower employed for supplying the ammonia containing gas to the oxidizer in this known process of making nitric acid.

The operation of the absorber preferably is so conducted that a slight excess of ammonia is supplied so that the gases leaving the absorber are slightly alkaline. Under these conditions the gases leaving the absorber are colorless and consist principally of the conveying gas and a large amount of water vapor or steam vaporized from the reaction mixture which is maintained hot by the heat of the reaction. The removal of water in the form of steam from the reaction mixture in the absorber serves to concentrate the ammonium nitrate solution formed up to say 85% which is practically the limit of concentration under the conditions described. Concentration of the ammonium nitrate solution from 85% to 100% and crystallization of the 100% solution is accomplished in the grainers 14 in the well-known manner. In order to facilitate the removal of water, introduced principally with the nitric acid supply, from the reaction mixture in the absorber the latter may be insulated or even jacketed for external heating. At the same time the flow of gas through the reaction mixture in the absorber and the evaporation of water serve to prevent the reaction mixture from attaining too high a temperature, i. e., the temperature at which ammonium nitrate is descomposed.

Any ammonia in the gas mixture which is not removed in the absorber, the reaction being conducted as stated so that the exit gases from the absorbers are slightly alkaline, is either absorbed in the condensed steam in the condenser 16 and recovered from resulting solution in the stripping column 1 and returned to the absorber or simply passes on with the stripping gas through the stripping column and back to the absorber and therefore is not lost.

It is desirable to operate the absorber under slightly reduced pressure, effected by the action of the blower 18 so as to prevent leakage of ammonia containing gas around the packing glands of the agitator shaft or elsewhere. The stripping column preferably is operated at practically atmospheric pressure.

From the foregoing description it will be apparent that my process is simple and continuous in operation, only a water solution of ammonia and nitric acid being supplied and the water accompanying the ammonia and nitric acid and a concentrated solution of ammonium nitrate ready for treatment in the grainers being discharged from the closed system. The transfer of ammonia from the water solution thereof to the nitric acid neutralizer is accomplished by a cyclical flow of an inert gas thus guarding against loss of the nitric acid and ammonia involved in the process.

I claim:

1. Process of making ammonium nitrate which comprises contacting an inert gas with a water solution of ammonia, contacting the resulting mixture of inert gas and ammonia with a solution containing ammonium nitrate, adding nitric acid to the solution of ammonium nitrate and reusing the unabsorbed inert gas for conveying more ammonia from the water solution thereof to the solution of ammonium nitrate.

2. Process of making ammonium nitrate which comprises circulating a stream of an inert gas in a closed cycle including a region of contact with a water solution of ammonia and a region of contact with a water solution of ammonium nitrate.

3. Process of making ammonium nitrate which comprises continuously contacting a stream of an inert gas with a continuously replenished body of a water solution of ammonia, contacting the resulting mixture of inert gas and ammonia in continuous flow with a solution of ammonium nitrate, adding nitric acid to the solution of ammonium nitrate, and returning the resulting unabsorbed inert gas into contact with said body of water solution of ammonia.

4. Process of making ammonium nitrate which comprises passing a stream of gas in a closed gas tight circuit including a region of contact with a water solution of ammonia, a region of contact with a solution of ammonium nitrate, and a region of contact with cooling and condensing means in succession.

5. Process of making ammonium nitrate as defined in claim 4 in which the region of contact with a solution of ammonium nitrate is maintained at sub-atmospheric pressure.

6. Process of making ammonium nitrate which comprises stripping a water solution of ammonia with a stream of air, contacting the resulting mixture of air and ammonia with a solution of ammonium nitrate maintained at an elevated temperature, adding nitric acid to said solution of ammonium nitrate, subjecting the resulting mixture of air and water vapor to cooling and condensation, delivering the condensate into a water solution of ammonia being stripped, and using the air for stripping a further quantity of water solution of ammonia.

In testimony whereof, I affix my signature.

HENRY HOWARD.